United States Patent
Lavoie et al.

(10) Patent No.: US 11,511,801 B2
(45) Date of Patent: Nov. 29, 2022

(54) TRAILER BACKUP ASSIST SYSTEMS AND METHODS

(71) Applicant: Ford Global Technologies, LLC, Dearborn, MI (US)

(72) Inventors: Erick Michael Lavoie, Van Buren Charter Township, MI (US); Hamid M. Golgiri, Livonia, MI (US); John Howard Schneider, South Lyon, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 139 days.

(21) Appl. No.: 17/168,254

(22) Filed: Feb. 5, 2021

(65) Prior Publication Data

US 2022/0250681 A1 Aug. 11, 2022

(51) Int. Cl.
| | | |
|---|---|---|
| *G06F 17/00* | (2019.01) | |
| *B62D 13/06* | (2006.01) | |
| *B62D 15/02* | (2006.01) | |
| *B62D 6/00* | (2006.01) | |

(52) U.S. Cl.
CPC .............. *B62D 13/06* (2013.01); *B62D 6/00* (2013.01); *B62D 15/028* (2013.01); *B62D 15/029* (2013.01)

(58) Field of Classification Search
CPC ........ B62D 13/06; B62D 6/00; B62D 15/028; B62D 15/029
USPC .......................................................... 701/42
See application file for complete search history.

(56) References Cited

U.S. PATENT DOCUMENTS

| | | | |
|---|---|---|---|
| 8,190,322 B2 | 5/2012 | Lin et al. | |
| 9,540,043 B2* | 1/2017 | Lavoie | B62D 13/06 |
| 10,421,490 B2* | 9/2019 | Lavoie | B62D 5/0481 |
| 10,913,494 B2* | 2/2021 | Ling | B60R 11/04 |
| 10,962,980 B2* | 3/2021 | Niewiadomski | G05D 1/0094 |
| 11,066,100 B2* | 7/2021 | Rhode | B62D 13/06 |
| 11,112,786 B2* | 9/2021 | Golgiri | B62D 15/0285 |
| 11,124,235 B2* | 9/2021 | Lavoie | B62D 15/027 |
| 11,148,489 B2* | 10/2021 | Golgiri | B60D 1/62 |
| 11,338,851 B2* | 5/2022 | Zhang | B62D 15/027 |
| 11,385,651 B2* | 7/2022 | Niewiadomski | B60D 1/62 |
| 2006/0130033 A1 | 6/2006 | Stoffels et al. | |
| 2009/0119657 A1 | 5/2009 | Link et al. | |
| 2011/0307336 A1 | 12/2011 | Smirnov et al. | |
| 2014/0310702 A1 | 4/2014 | Ricci et al. | |
| 2014/0303847 A1* | 10/2014 | Lavoie | B62D 15/0275 701/41 |

(Continued)

OTHER PUBLICATIONS

S. Halder et al. "Secure Over-The-Air Software Updates in Connected Vehicles: A Survey" (Jun. 2020).

(Continued)

*Primary Examiner* — Ronnie M Mancho
(74) *Attorney, Agent, or Firm* — Frank Lollo; Eversheds Sutherland (US) LLP

(57) ABSTRACT

The systems and methods disclosed herein are configured to determine if a trailer backup assist system is needed to assist a driver with a procedure to backup a trailer that is connected to a vehicle. The estimation of need for assistance may be determined by an assistance model. If assistance is needed, the systems and methods provide an input to initiate a process to enable the trailer backup assist system.

20 Claims, 5 Drawing Sheets

(56) References Cited

U.S. PATENT DOCUMENTS

| | | | |
|---|---|---|---|
| 2016/0023526 A1* | 1/2016 | Lavoie | B62D 15/027 |
| | | | 701/41 |
| 2016/0362135 A1* | 12/2016 | Xu | B62D 13/06 |
| 2017/0106869 A1* | 4/2017 | Lavoie | B60T 7/20 |
| 2017/0174128 A1* | 6/2017 | Hu | G06T 7/74 |
| 2017/0178328 A1* | 6/2017 | Hu | H04N 7/183 |
| 2017/0247053 A1* | 8/2017 | Lavoie | B62D 15/0285 |
| 2017/0297619 A1* | 10/2017 | Lavoie | B62D 15/024 |
| 2018/0001928 A1* | 1/2018 | Lavoie | B62D 15/021 |
| 2021/0245660 A1* | 8/2021 | Lavoie | B60R 1/006 |
| 2021/0269092 A1* | 9/2021 | Golgiri | B60D 1/62 |
| 2021/0291832 A1* | 9/2021 | Simmons | B60W 10/20 |
| 2022/0004183 A1* | 1/2022 | Raeis Hosseiny | B62D 15/0285 |
| 2022/0066442 A1* | 3/2022 | Hosseiny | H04W 4/027 |
| 2022/0144339 A1* | 5/2022 | Lavoie | B60Q 9/005 |
| 2022/0161616 A1* | 5/2022 | Golgiri | B62D 13/06 |
| 2022/0179410 A1* | 6/2022 | Lavoie | G05D 1/0016 |
| 2022/0219751 A1* | 7/2022 | Aradhyula | B62D 15/027 |

OTHER PUBLICATIONS

G. De Boer et al. "Generic Remote Software Update for Vehicle ECUS Using a Telematics Device as a Gateway" (2005) pp. 371-380.

* cited by examiner

TRAILER BACKUP ASSIST SYSTEMS AND METHODS

BACKGROUND

Operating a vehicle with a trailer in tow is very challenging for many drivers. This is particularly true for drivers that are unskilled at backing up vehicles with attached trailers. Such drivers may include those that drive with a trailer on an infrequent basis (e.g., drivers that rent a trailer). For example, when manually reversing a trailer, the direction of the steering wheel input may be counterintuitive to the resulting trailer direction.

In addition, a driver may not know if a trailer backup assist feature is needed or wanted at the time of purchasing a vehicle. It is with respect to these and other considerations that the disclosure made herein is presented.

DESCRIPTION OF THE FIGURES

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

The systems and methods disclosed herein are configured to determine if a trailer backup assist system is needed to assist a driver with a procedure to backup a trailer that is connected to a vehicle. The estimation of need for assistance may be determined by an assistance model. If assistance is needed, the systems and methods provide an input to initiate a process to enable the trailer backup assist system.

Figure 1:
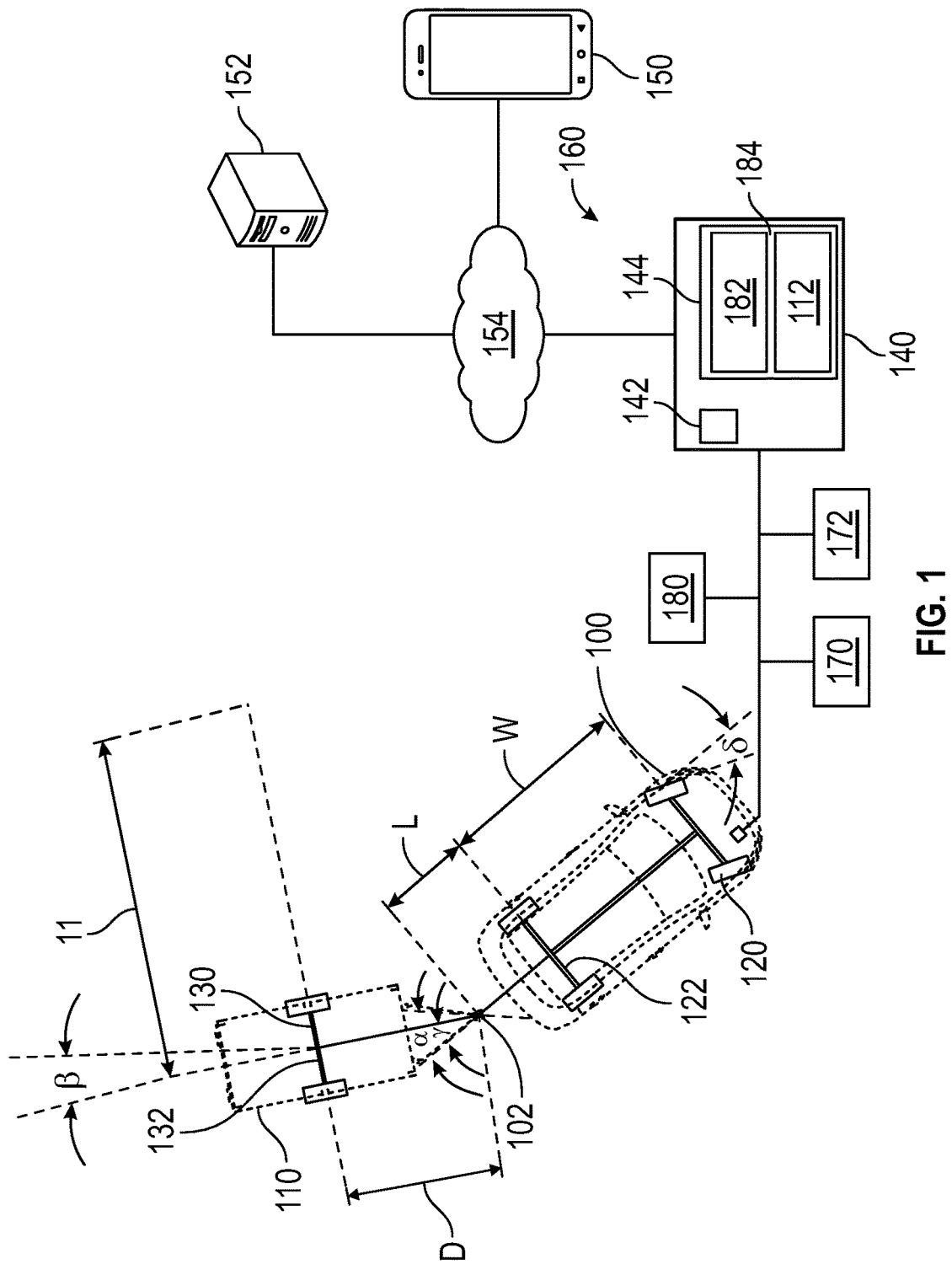
FIG. 1 depicts a vehicle, a trailer, and a vehicle control system in accordance with the present disclosure.

Referring to FIG. 1, a vehicle control system 160 determines if a vehicle 100 has a trailer backup assist system 172 that has not been enabled. In addition, the vehicle control system 160 determines if a trailer 110 is connected to the vehicle 100.

For a vehicle 100 with a trailer backup assist system 172 that is not enabled and with a trailer 110 attached, the vehicle control system 160 determines a level of assistance needed with a trailer backup procedure. For example, the vehicle control system 160 may include an assistance model 182 that determines a probability of need of assistance based on sensor 180 data (e.g., data 184) acquired during a manual trailer backup session. A manual trailer assist backup session is a trailer backup maneuver that is not assisted by driver assist technologies.

The vehicle control system 160 provides, if the level of assistance needed is above a threshold, means for enabling the trailer backup assist system 172. Steps to enable the trailer backup assist system 172 may include completing a transaction to purchase the trailer backup assist system 172.

If the vehicle control system 160 receives an input to complete the steps required to enable the trailer backup assist system 172, the vehicle system enables the trailer backup assist system. Enabling the trailer backup assist system 172 may include downloading software to enable operation of hardware of the trailer backup assist system 172.

These and other advantages of the present disclosure are provided in greater detail herein.

Illustrative Embodiments

The disclosure will be described more fully hereinafter with reference to the accompanying drawings, in which exemplary embodiments of the disclosure are shown, and not intended to be limiting.

FIG. 1 illustrates a vehicle 100. The vehicle 100 includes a hitch 102 (also referred to as a tow hitch, a tow bar, a trailer hitch, hitch point etc.) that is located at the back end of the vehicle 100. For example, the hitch 102 is coupled to and extends from a chassis of the vehicle 100.

The vehicle 100 may take the form of another passenger or commercial automobile such as, for example, a truck, a car, a sport utility vehicle, a crossover vehicle, a van, a minivan, a taxi, a bus, etc., and may be configured to include various types of automotive drive systems. Example drive systems can include various types of internal combustion engine (ICE) powertrains having a gasoline, diesel, or natural gas-powered combustion engine with conventional drive components such as, a transmission, a drive shaft, a differential, etc.

In another configuration, the vehicle 100 may be configured as an electric vehicle (EV). More particularly, the vehicle 100 may include a battery EV (BEV) drive system. The vehicle 100 may be configured as a hybrid EV (HEV) having an independent onboard power plant or a plug-in HEV (PHEV) that includes a HEV powertrain connectable to an external power source (including a parallel or series hybrid powertrain having a combustion engine power plant and one or more EV drive systems). HEVs can include battery and/or super capacitor banks for power storage, flywheel power storage systems, or other power generation and storage infrastructure.

The vehicle 100 may be further configured as a fuel cell vehicle (FCV) that converts liquid or solid fuel to usable power using a fuel cell, (e.g., a hydrogen fuel cell vehicle (HFCV) powertrain, etc.) and/or any combination of these drive systems and components.

Further, the vehicle 100 may be a manually driven vehicle, and/or be configured to operate in a fully autonomous (e.g., driverless) mode (e.g., level-5 autonomy) or in one or more partial autonomy modes. Examples of partial autonomy modes are widely understood in the art as autonomy Levels 1 through 5.

An autonomous vehicle (AV) having Level-1 autonomy may generally include a single automated driver assistance feature, such as steering or acceleration assistance. Adaptive cruise control is one such example of a Level-1 autonomous system that includes aspects of both acceleration and steering.

Level-2 autonomy in vehicles may provide partial automation of steering and acceleration functionality, where the automated system(s) are supervised by a human driver that performs non-automated operations such as braking and other controls.

Level-3 autonomy in a vehicle can generally provide conditional automation and control of driving features. For example, Level-3 vehicle autonomy typically includes "environmental detection" capabilities, where the vehicle can make informed decisions independently from a present driver, such as accelerating past a slow-moving vehicle, while the present driver remains ready to retake control of the vehicle if the system is unable to execute the task.

Level-4 autonomy includes vehicles having high levels of autonomy that can operate independently from a human driver, but still include human controls for override operation. Level-4 automation may also enable a self-driving mode to intervene responsive to a predefined conditional trigger, such as a road hazard or a system failure.

Level-5 autonomy is associated with autonomous vehicle systems that require no human input for operation, and generally do not include human operational driving controls.

A trailer 110 is coupled to the vehicle 100 via the hitch (e.g., hitch point 102) such that the vehicle 100 is able to pull or push the trailer 110 from one location to another location. Trailers are utilized for various purposes including hauling objects (e.g., other vehicles or boats), moving, and camping.

The hitch 102 is configured to receive a trailer connector (as illustrated, located at the front end) of the trailer 110 to couple the trailer 110 to the vehicle 100. The hitch 102 allows the trailer 110 to rotate. The trailer 110 follows the path of the vehicle 100 when the vehicle 100 moves forward. The path of the trailer 110 when the vehicle 100 moves in reverse depends on the direction of force (e.g., due to steering angle) applied by the vehicle 100 at the hitch 102 among other factors described in further detail below with respect to a kinematic model 112.

A kinematic model may be used to illustrate a relationship between a curvature of a path of travel of the trailer 110 and a steering angle of the vehicle 100. For purposes of description, a low order kinematic model is described in which certain assumptions are made with regard to some parameters. Such assumptions may include, but are not limited to, the trailer 110 is backed up by the vehicle 100 at a relatively low speed, the wheels of the vehicle 100 and the wheels of the trailer 110 have negligible slip, the vehicle 100 and the trailer 110 have negligible lateral compliance, the tires of the vehicle 100 and the trailer 110 have negligible deformation, the actuator dynamics of the vehicle 100 are negligible, and the vehicle 100 and the trailer 110 exhibit negligible roll or pitch motions.

As shown in FIG. 1, a kinematic model of the vehicle 100 and the trailer 110 is based on various parameters associated with the vehicle 100 and the trailer 110.

These kinematic model parameters include: steering angle (delta $\delta$) of front wheels 120 of the vehicle 100; yaw angle (alpha $\alpha$) of the vehicle 100; yaw angle (beta $\beta$) of the trailer 110; hitch angle (gamma $\gamma$) (gamma=beta–alpha); wheel base (W) of the vehicle 100; length (L) between the hitch point 102 and a rear axle 122 of the vehicle 100; length (D) between the hitch point 102 and an axle 130 of the trailer 110; and a radius of curvature (r) at a midpoint 132 of the axle 130 of the trailer 110.

The kinematic model 112 provides a relationship between the radius of curvature (r), the steering angle (delta), and the hitch angle (gamma). The radius of curvature (r) relates to the curvature of a trailer path of the trailer 110. In particular, as shown in the equation below, this relationship can be expressed to provide a trailer path curvature (kappa) such that, if hitch angle (gamma) is given (e.g., measured), the trailer path curvature (kappa) can be controlled based on controlling the steering angle (delta), for example, with a steering system 170.

$$\kappa = \frac{1}{r} = \frac{\dot{\beta}}{\dot{\eta}} = \frac{\left(W + \frac{KV^2}{g}\right)\sin\gamma + L\cos\gamma\tan\delta}{D\left(\left(W + \frac{KV^2}{g}\right)\cos\gamma - K\sin\gamma\tan\delta\right)}$$

Here, $\beta$ dot (derivative of beta) is a trailer yaw rate and $\eta$ dot (derivative of eta) is a trailer velocity. This relationship can also be used to provide the steering angle (delta), for example, for the steering system 170 to achieve. Here, the steering angle (delta) is a function of trailer path curvature (kappa), which is input to the trailer backup assist system 172, and the hitch angle (gamma), which is measured.

$$\delta = \tan^{-1}\left(\frac{\left(W + \frac{KV^2}{g}\right)[\kappa D\cos\gamma - \sin\gamma]}{DL\kappa\sin\gamma + L\cos\gamma}\right)$$

For a particular vehicle 100 and trailer 110 combination, certain kinematic model parameters (e.g., D, W and L) are constant and assumed known. V is the vehicle longitudinal speed and g is the acceleration due to gravity. K is a speed dependent parameter which when set to zero makes the calculation of steering angle independent of vehicle speed. For example, vehicle-specific kinematic model parameters can be predefined in an electronic control system of a vehicle 100 and trailer-specific kinematic model parameters can be inputted by a user of the vehicle 100.

The vehicle 100 includes an automotive computer 140. The automotive computer 140 may be or include an electronic vehicle controller. The automotive computer 140 may be installed in an engine compartment of the vehicle 100 as schematically illustrated or elsewhere in the vehicle 100.

The automotive computer 140 may include one or more processor(s) 142 and a computer-readable memory 144. The one or more processor(s) 142 may be disposed in communication with one or more memory devices disposed in communication with the respective computing systems (e.g., the memory 144 and/or one or more external databases). The processor(s) 142 may utilize the memory 144 to store programs in code and/or to store data for performing aspects of methods in accordance with the disclosure (e.g., kinematic model 112, the assistance model 182, session data 184, and method 300).

The memory 144 may be a non-transitory computer-readable memory storing program code. The memory 144 can include any one or a combination of volatile memory elements (e.g., dynamic random access memory (DRAM), synchronous dynamic random access memory (SDRAM), etc.) and can include any one or more nonvolatile memory elements (e.g., erasable programmable read-only memory (EPROM), flash memory, electronically erasable programmable read-only memory (EEPROM), programmable read-only memory (PROM), etc.

The automotive computer 140 may, in some example embodiments, be disposed in communication with a mobile device 150 and one or more server(s) 152 via a network 154. Each of the mobile device 150 and the server 152 may include a processor and a memory as described above. In some instances, the mobile device may be in direct communication with the vehicles via one or more wireless connections, such as Bluetooth®, BLE, Wi-Fi, Ultra-Wide Band (UWB), or LiFi. Any wireless connection may be used herein.

The network(s) 154 illustrate an example communication infrastructure in which the connected devices may communicate. The network(s) 154 may be and/or include the Internet, a private network, public network or other configuration that operates using any one or more known communication protocols such as, for example, transmission control protocol/Internet protocol (TCP/IP), Bluetooth®, Wi-Fi based on the Institute of Electrical and Electronics Engineers (IEEE) standard 802.11, Ultra-Wide Band (UWB), and cellular technologies such as Time Division Multiple Access (TDMA), Code Division Multiple Access (CDMA), High Speed Packet Access (HSPDA), Long-Term Evolution (LTE), Global System for Mobile Communications (GSM), and Fifth Generation (5G), to name a few examples.

The vehicle control system 160 may include the automotive computer 140, the mobile device 150, the server 152, and the like. The vehicle control system 160 may be configured or programmed to control or enable and disable one or more vehicle subsystems. Examples of subsystems that may be controlled include the steering system 170 (e.g., one or more systems for controlling braking, ignition, steering, acceleration, transmission control, and/or other control mechanisms) and the trailer backup assist system 172. The vehicle control system 160 may control the subsystems based, at least in part, on data generated by sensors 180 and analyzed by an assistance model 182.

The sensors 180 may include sensors to measure parameters of the kinematic model 112 including the yaw angle (alpha) of the vehicle, the yaw angle (beta) of the trailer, the steering angle (delta) of the vehicle, and the like. For example, the yaw angle sensors may include a compass or magnetometer.

The sensors 180 may include sensors to measure other data acquired during a manual trailer backup session including a duration of the manual trailer backup session (e.g., a timer), a door open sensor, which gear the vehicle is in, the starting location and ending location (e.g., a GPS sensor), the vehicle speed, and the like.

The sensors 180 may include sensors for measurements of resistance (e.g., a change in resistance on a circuit to which a 4-pin or 7-pin connector may be connected. Alternatively or additionally, the sensors 180 may include back-up cameras, sensors for load detection (e.g., torque measurements), and the like.

The sensors 180 may also include autonomous driving sensors, which include any number of devices configured or programmed to generate signals that help navigate the vehicle 100 while the vehicle 100 is operating in an autonomous (e.g., driverless) mode. Examples of autonomous driving sensors 180 include a Radio Detection and Ranging (RADAR or "radar") sensor configured for detection and localization of objects using radio waves, a Light Detecting and Ranging (LiDAR or "lidar") sensor, a vision sensor system having trajectory, obstacle detection, object classification, augmented reality, and/or other capabilities, and/or the like.

The vehicle control system 160 (e.g., processor 142) may calculate certain parameters of the kinematic model 112 including a jackknife angle, a hitch angle (gamma), a distance from a hitch angle (gamma), a radius of curvature of the trailer or trailer path curvature (kappa), and the like.

The vehicle control system 160 may determine when the trailer 110 is connected to the vehicle 100 via a calculation of resistance or change in resistance (e.g., a change in resistance on a circuit to which a 4-pin or 7-pin connector may be connected), calculation of a load, computer vision, and the like.

Figure 2:
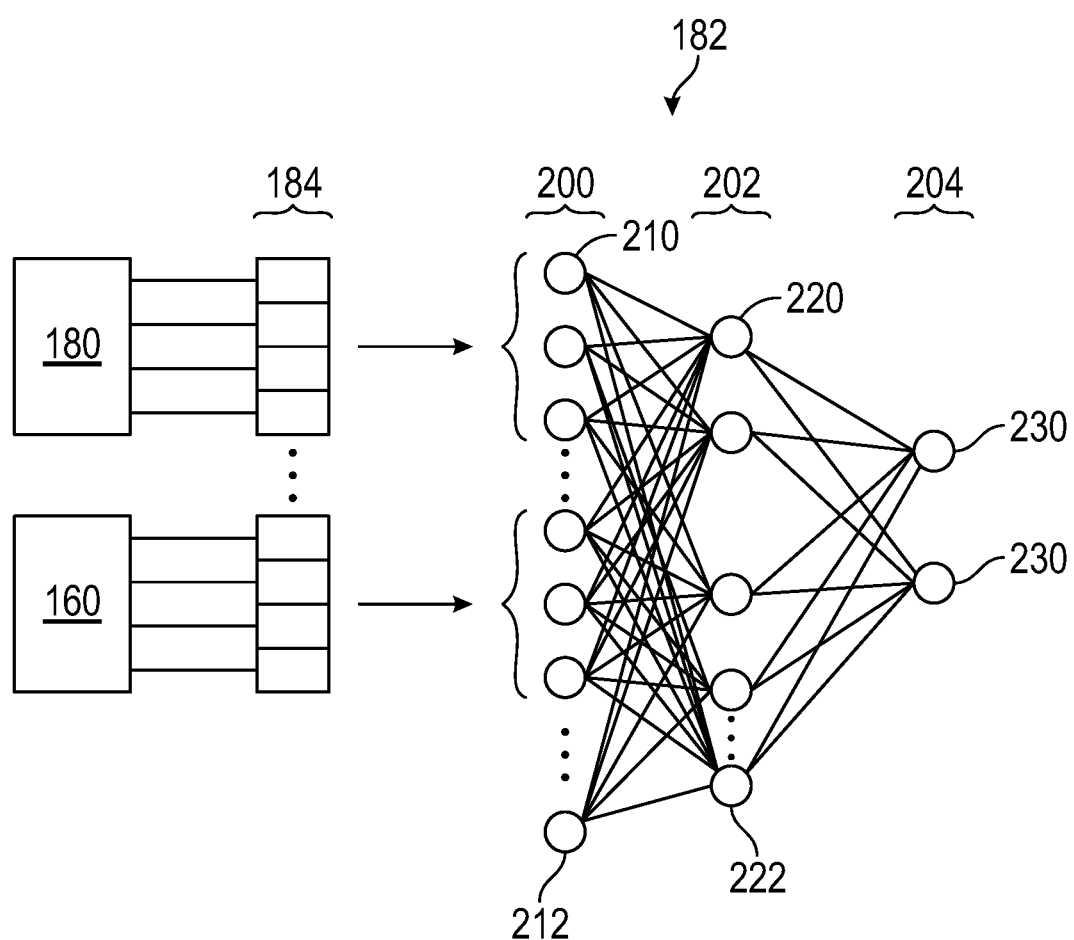
FIG. 2 is a schematic illustration of an assistance model in accordance with the present disclosure.
Figure 3:
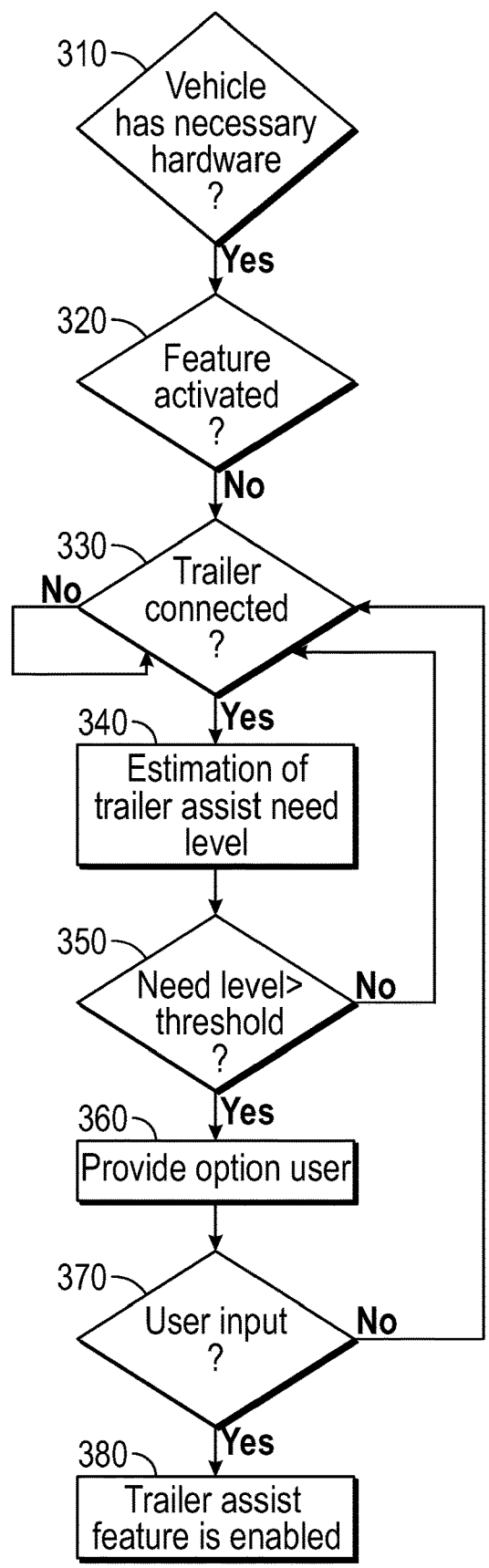
FIG. 3 is a flow chart of an exemplary method in accordance with the present disclosure.

Referring to FIG. 2, an assistance model 182 may include an input layer 200, one or more hidden layers 202, and an output layer 204. The values for the input layer 200 may be backup session data 184. The output layer 204 is the predicted need for assistance.

The backup session data 184 includes data measured by the sensors 180 during a session and parameters that are calculated from the data measured by the sensors 180 during a session (e.g., calculations by vehicle control system 160). In particular, the backup session data 184 may include a duration of the manual trailer backup session, the number of times a door is opened and closed during the session, a number of oscillations between a forward gear and a reverse gear, the yaw angle of the vehicle (e.g., change in angle over time), the yaw angle of the trailer (e.g., change in angle over time), the hitch angle, a jackknife angle, radius of curvature of the trailer or trailer path curvature, steering angle of the vehicle, starting location, ending location, vehicle speed, and the like.

The manual trailer backup session may be initiated (e.g., for data 184 collection) when the vehicle 100 is placed in reverse when the trailer 110 is connected.

The nodes 210 of the input layer 200 are the backup session data 184 and a bias node 212. The hidden layers 202 may have various numbers of "activation" nodes 220 and a bias node 222. The nodes 230 of the output layer are the labels that characterize each session, for example, "needs assistance" and "doesn't need assistance" (e.g., the assistance model 182 predicts probability values for a need for assistance).

Each node is connected to each node in the next layer and each connection has a weight such that each node in the hidden layer 202 is a weighted sum of each of the nodes in the previous layer (e.g., the input layer 200 or a hidden layer if additional hidden layers 202 are used). Each node has an activation function (e.g., a unit step) that determines a value (e.g., from zero to one) based on the weighed sum.

The input values of the input layer 200 are the backup session data 184. The value at each node in each layer after the first layer is calculated by what may be referred to as a hypothesis function. The hypothesis function is the activation function applied to a weighted sum of the values of the previous layer of nodes (e.g., input values). The weighted sum is the values of the previous layer multiplied by weights between the nodes of the previous layer and the nodes of the current layer.

The activation function may be a sigmoid function with a range of values between zero and one. Because multiple output labels are used, the sigmoid function allows for different probabilities or levels of activation of a node and the model chooses the output label with the highest probability of fitting the backup session data 184. The bias node allows the activation function to shift or to change steepness.

A cost function represents the sum of the error (e.g., difference between the predicted value and the real value). The assistance model 182 determines values for the weights that minimize the error of the cost function. For training and testing, data that is collected from backup sessions and labeled (i.e., known output values) are used. For example, if backup session data 184 is labeled as "needs assistance," the output values for the output layer 204 will be a value of one for "needs assistance" and zero for "doesn't need assistance." If backup session data 184 is labeled as "doesn't needs assistance," the output values for the output layer 504 will be a value of zero for "needs assistance" and one for "doesn't need assistance."

The weights can be calculated with backpropagation methods using the backup session data 184 that is labeled as training examples and for testing for accuracy.

According to a first step 310 of an exemplary method 300, a vehicle control system 160 determines if the vehicle 100 has a trailer backup assist system 172 (e.g., the necessary hardware such as knob 400). According to a second step 320, the vehicle control system 160 determines if the trailer backup assist system 172 is activated or enabled. For example, the feature may be enabled at a dealership as part of purchasing the vehicle 100.

According to a third step 330, the vehicle control system 160 determines if the trailer 110 is connected to the vehicle 100 (e.g., as described above). If not, the method 300 may repeat the third step 330 until the trailer 110 is connected to the vehicle 100.

The vehicle control system 160 may use measurements of resistance (e.g., a change in resistance on a circuit when a trailer is attached to a (e.g., to a 4-pin or 7-pin connector)) to determine if a trailer 110 is connected. The vehicle control system 160 may use object detection algorithms to identify a trailer 110 in an image from a backup camera. The vehicle control system 160 may calculate a load or level of torque required to determine if a trailer is connected.

According to a fourth step 340, the vehicle control system 160 determines a level of assistance needed with a trailer backup procedure. For example, the assistance model 182 determines a probability of need of assistance based on backup session data 184 acquired during a manual trailer backup session.

According to a fifth step 350, the vehicle control system 160 determines if the level of assistance needed is greater than a certain threshold. If not, the method 300 may return to step 330.

According to a sixth step 360, the vehicle control system 160 provides, if the level of assistance needed as determined by the assistance model 182 is above the threshold at the fifth step 350, an option to enable the trailer backup assist system 172. For example, the vehicle control system 160 may provide a selection via a user interface to initiate a process of enabling the trailer backup assist system 172.

In particular, the selection may include multiple selections associated with different offers or promotions to upgrade the vehicle to one or more trailer assist technologies. For example, an offer may include use of the trailer backup assist system 172 system for ten automated hitches and ten automated trailer maneuvers at no charge before an upgrade charge would be required. An offer can include a plans with different subscription levels that cover a number of usages, a number of vehicles, or a one-time charge that covers a certain capability level for a number of vehicles. The plan or subscription may transfer to provide access to features with new or rented vehicles.

Alternately, plans may be offered that target individual users, households and businesses. For example, an individual may wish to have a plan that can be transferred between vehicles with their phone, while a family may wish for the trailer software on a particular vehicle to be unlocked for multiple people to use. A vehicle rental company may wish to offer the vehicle with the feature already enabled. In a different use case, vehicles may be upgraded/downgraded by a dealer to change price point or provide capability for demonstration purposes.

According to a seventh step 370, if the user provides an input to decline the option to enable the trailer backup assist system 172, the method returns to step 330. Alternatively, if the user provides an input to initiate a process to enable the trailer backup assist system 172, the vehicle control system 160 proceeds to with a process to enable the trailer backup assist system 172. The process of enabling the trailer backup assist system 172 may include completing a transaction to purchase the trailer backup assist system 172 and downloading software (e.g., including the kinematic model 112) to operate the hardware of the trailer backup assist system 172.

According to an eighth step 380, upon completion of the process of step 370, the trailer backup assist system 172 is enabled and configured to perform an assisted trailer backup procedure as described in further detail below.

When enabled, the trailer backup assist system 172 is configured to receive an input to select a trailer path curvature (e.g., kappa) according to where the user wants the trailer 110 to go, calculate a steering angle (delta) (including measuring the necessary parameters of the kinematic model with the sensors 180), and generate steering commands to achieve the steering angle (delta) with the steering system 170 (e.g., electric power assisted steering (EPAS) system).

To receive an input to select a trailer path curvature (kappa), the trailer backup assist system 172 may include a control knob, a decoupled steering wheel, a set of virtual buttons, or a touch screen (e.g., on the mobile device 150) although the system is not limited to any particular configuration of interface through which a desired trailer path curvature may be provided.

Figure 4:
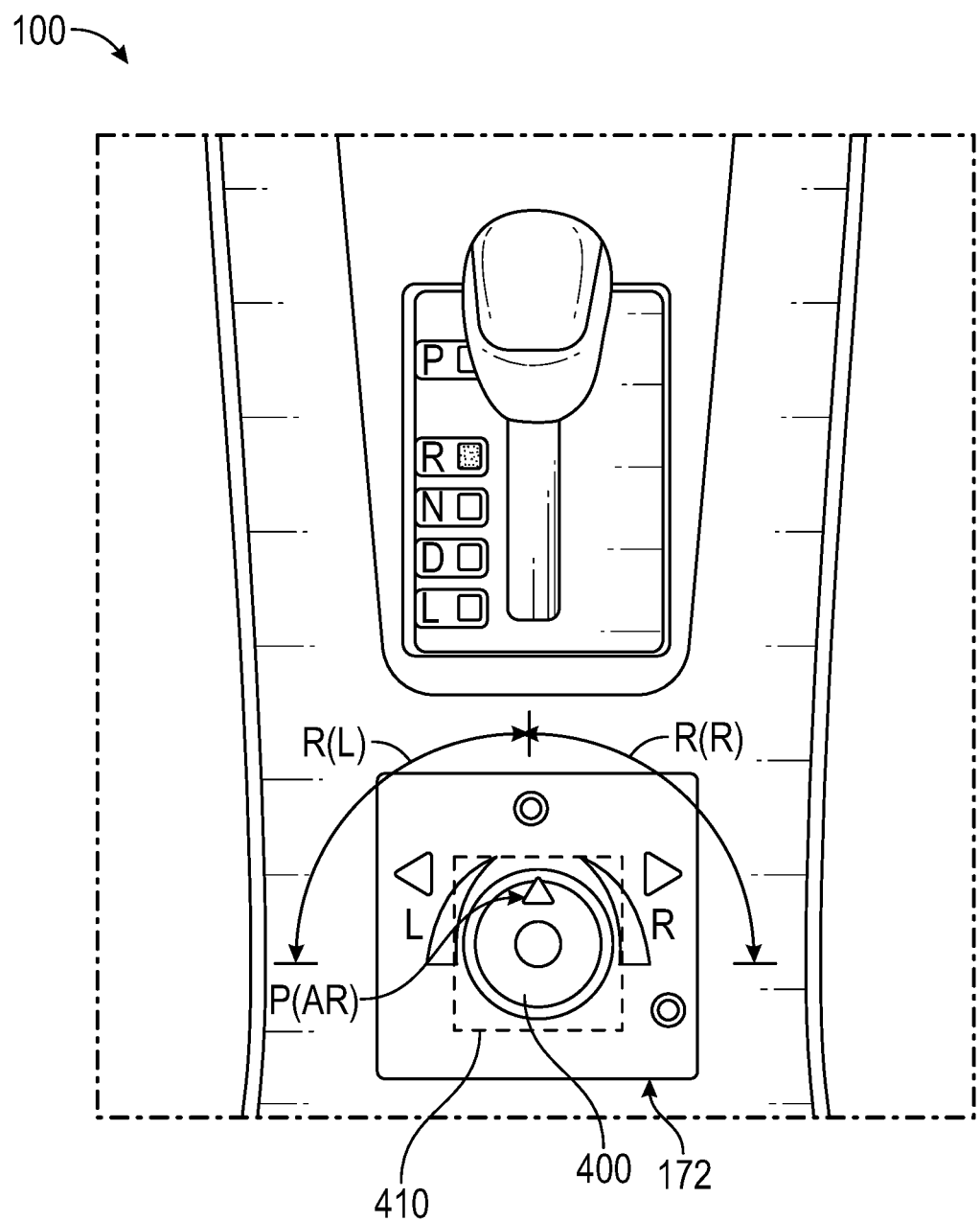
FIG. 4 is an input knob of a trailer backup assist system in accordance with the present disclosure.

For purposes of illustration, referring to FIG. 4, a rotatable control element in the form of a knob 400 is coupled to a movement sensing device 410. The knob 400 is biased (e.g., by a spring return) to an at-rest position P(AR) between opposing rotational ranges of motion R(R), R(L)

The movement sensing device 410 is configured for sensing movement of the knob 400 and outputting a corresponding signal (i.e., movement sensing device signal) to the trailer backup assist system 172. A signal from the movement sensing device 410 is generated as a function of an amount of rotation of the knob 400 with respect to the at-rest position P(AR), a rate movement of the knob 400, and/or a direction of movement of the knob 400 with respect to the at-rest position P(AR).

The at-rest position P(AR) of the knob 400 corresponds to a movement sensing device signal indicating that the vehicle 100 should be steered such that the trailer 110 is backed along a substantially straight path as defined by a centerline longitudinal axis of the trailer 110. A maximum clockwise and counter-clockwise position of the knob 400 (i.e., limits of the opposing rotational ranges of motion R(R), R(L)) each corresponds to a respective movement sensing device signal indicating a tightest radius of curvature (i.e., most acute trajectory) of a path of travel of the trailer 110 that is possible without the corresponding vehicle steering information causing a jack-knife condition. In this regard, the at-rest position P(AR) is a zero-curvature commanding position with respect to the opposing rotational ranges of motion R(R), R(L).

A ratio of a commanded curvature of a path of a trailer (e.g., radius of a trailer trajectory) and a corresponding amount of rotation of the knob can vary (e.g., non-linearly) over each one of the opposing rotational ranges of motion R(L), R(R) of the knob 400. The ratio can be a function of vehicle speed, trailer geometry, vehicle geometry, hitch geometry trailer load, and the like.

In use, a driver can turn the knob 400 to dictate a curvature of a path of the trailer 110 to follow and the knob 400 can be left at the at-rest position P(AR) to back the trailer 110 along a straight line.

Figure 5:
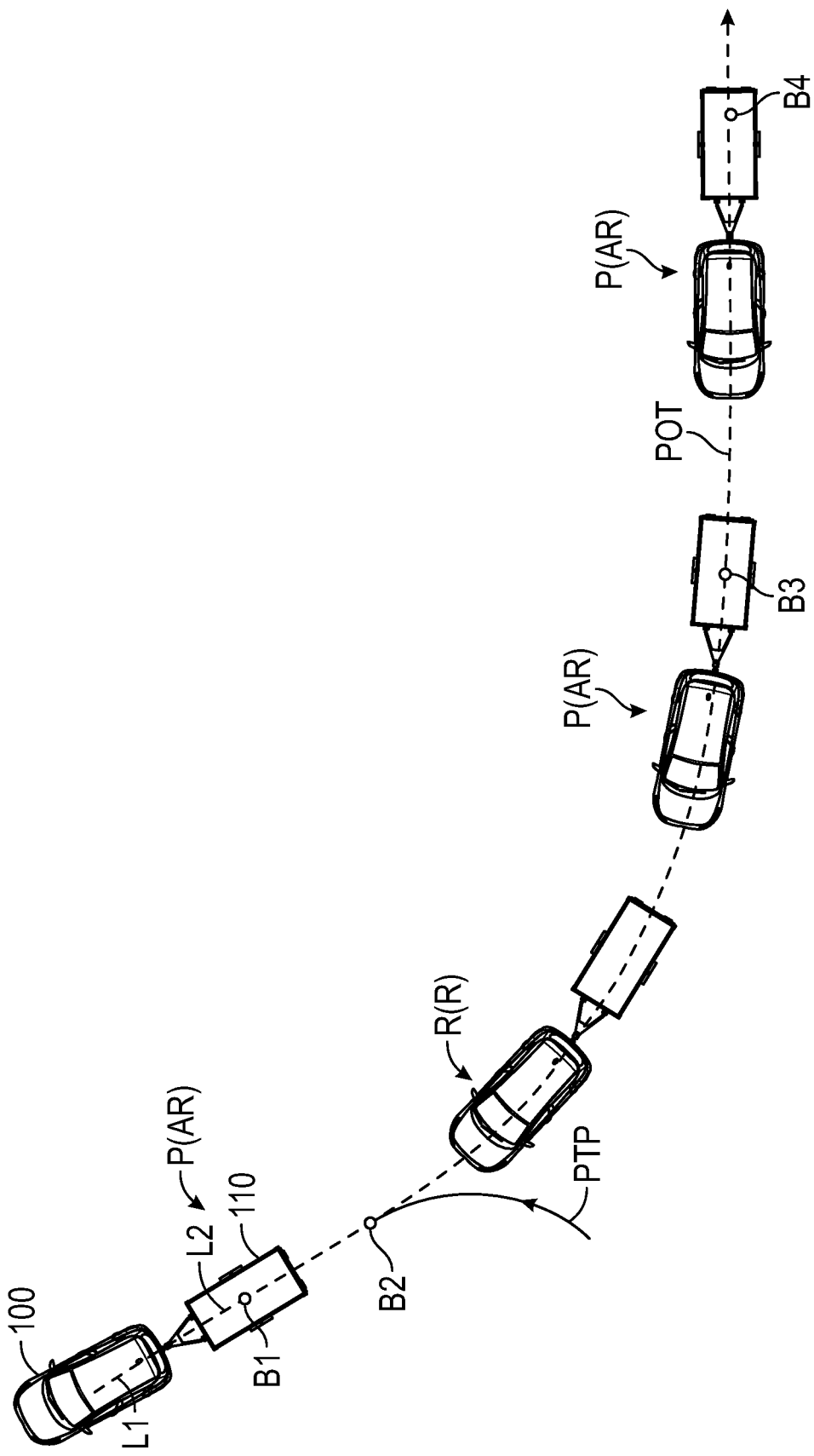
FIG. 5 is a schematic illustration of a trailer backup procedure using a trailer backup assist system in accordance with the present disclosure.

Referring now to FIGS. 4 and 5, an example of using the trailer backup assist system 172 to control a curvature of a path of travel (POT) of a trailer 110 is shown. In preparation of backing the trailer 110, the driver of the vehicle 100 drives the vehicle 100 forward along a pull-thru path (PTP) to position the vehicle 100 and trailer 110 at a first backup position B1. In the first backup position B1, the vehicle 100 and trailer 110 are longitudinally aligned with each other such that a longitudinal centerline axis L1 of the vehicle 100 is aligned with (e.g., parallel with or coincidental with) a longitudinal centerline axis L2 of the trailer 110. It is disclosed herein that such alignment of the longitudinal axes L1, L2 at the onset of an instance of trailer backup functionality is not a requirement for operability of a trailer backup assist system 172 configured in accordance with the inventive subject matter.

After activating the trailer backup assist system 172 (e.g., before, after, or during the pull-thru sequence), the driver begins to back the trailer 110 by reversing the vehicle 100 from the first backup position B1. So long as the knob 400 of the trailer backup assist system 172 remains in the at-rest position P(AR), the trailer backup assist system 172 will steer the vehicle 100 as necessary for causing the trailer 110 to be backed along a substantially straight path of travel as defined by the longitudinal centerline axis L2 of the trailer 110 at the time when backing of the trailer 110 began.

When the trailer 110 reaches the second backup position B2, the driver rotates the knob 400 to command the trailer 110 to be steered to the right (i.e., a knob position R(R)). Accordingly, the trailer backup assist system 172 will steer the vehicle 100 to steer the trailer 110 to the right as a function of an amount of rotation of the knob 400 with respect to the at-rest position P(AR). Similarly, the trailer 110 can be commanded to steer the trailer 110 to the left by rotating the knob 400 to the left.

When the trailer reaches backup position B3, the driver allows the knob 400 to return to the at-rest position P(AR) thereby causing the trailer backup assist system 172 to steer the vehicle 100 as necessary for causing the trailer 110 to be backed along a substantially straight path of travel as defined by the longitudinal centerline axis L2 of the trailer 110 at the time when the knob 400 was returned to the at-rest position P(AR).

Thereafter, the trailer backup assist system 172 steers the vehicle 100 as necessary for causing the trailer 110 to be backed along this substantially straight path to the fourth backup position B4.

In this regard, arcuate (e.g., curved) portions of a path of travel POT of the trailer 110 are controlled by rotation of the knob 400 and straight portions of the path of travel POT are controlled by an orientation of the centerline longitudinal axis L2 of the trailer when the knob 400 is in/returned to the at-rest position P(AR).

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a feature, structure, or characteristic is described in connection with an embodiment, one skilled in the art will recognize such feature, structure, or characteristic in connection with other embodiments whether or not explicitly described.

It should also be understood that the word "example" as used herein is intended to be non-exclusionary and non-limiting in nature. More particularly, the word "exemplary" as used herein indicates one among several examples, and it should be understood that no undue emphasis or preference is being directed to the particular example being described.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, nonvolatile media and volatile media. Computing devices may include computer-executable instructions, where the instructions may be executable by one or more computing devices such as those listed above and stored on a computer-readable medium.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating various embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

What is claimed is:

1. A method, comprising:
   determining that a trailer is connected to a vehicle;
   acquiring data, based on the trailer being connected to the vehicle, during a manual trailer backup session;
   determining, with an assistance model and based on the data acquired during the manual trailer backup session, a level of assistance needed; and
   providing, based on the level of assistance exceeding a threshold, an input to initiate a process of enabling a trailer backup assist system.

2. The method of claim 1, further comprising enabling the trailer backup assist system in response to receiving the input.

3. The method of claim 1, wherein determining that the trailer is connected to the vehicle includes a measurement of resistance of a circuit, object detection using a camera, and/or a measurement of a load.

4. The method of claim 1, wherein the level of assistance comprises a probability that assistance is needed.

5. The method of claim 1, further comprising initiating the manual trailer backup session in response to the vehicle being placed in reverse.

6. The method of claim 1, wherein the data acquired during the manual trailer backup session includes a duration, a number of times a door is opened and closed, a number of oscillations between a forward gear and a reverse gear, a yaw angle of the vehicle, a yaw angle of the trailer, a hitch angle, a jackknife angle, a radius of curvature of the trailer or trailer path curvature, a steering angle of the vehicle, a starting location, an ending location, and/or a vehicle speed.

7. The method of claim 1, wherein the assistance model is trained with data acquired during manual trailer backup sessions where each session is labeled as one of assistance needed or assistance not needed.

8. The method of claim 1, wherein the process of enabling the trailer backup assist system includes completing a transaction.

9. The method of claim 1, wherein the process of enabling the trailer backup assist system includes downloading software.

10. A vehicle, comprising:
    a trailer backup assist system that is configured to be selectively disabled and enabled, the trailer backup assist system comprising a sensor;
    a processor; and
    a memory comprising:
      an assistance model;
      instructions that, when executed by the processor, cause the processor to perform operations comprising:
        determining if a trailer is connected to the vehicle;
        acquiring data, if the trailer is connected to the vehicle, during a manual trailer backup session;
        determining, with the assistance model and based on the data acquired during the manual trailer backup session, a level of assistance needed, the data acquired including data from the sensor; and
        providing, if the level of assistance exceeds a threshold, an input to initiate a process of enabling the trailer backup assist system.

11. The vehicle of claim 10, wherein the instructions further comprise enabling the trailer backup assist system in response to receiving the input.

12. The vehicle of claim 10, wherein the trailer backup assist system is configured to determine a curvature of a trailer path.

13. The vehicle of claim 12, wherein the trailer backup assist system is configured to generate instructions for a steering control system based on the curvature of the trailer path.

14. The vehicle of claim 10, wherein determining if the trailer is connected to the vehicle includes a measurement of resistance of a circuit, object detection using a camera, and/or a measurement of a load.

15. The vehicle of claim 10, wherein the level of assistance comprises a probability that assistance is needed.

16. The vehicle of claim 10, wherein the instructions further comprise initiating the manual trailer backup session in response to the vehicle being placed in reverse.

17. The vehicle of claim 10, wherein the data acquired during the manual trailer backup session includes a duration, a number of times a door is opened and closed, a number of oscillations between a forward gear and a reverse gear, a yaw angle of the vehicle, a yaw angle of the trailer, a hitch angle, a jackknife angle, a radius of curvature of the trailer or trailer path curvature, a steering angle of the vehicle, a starting location, an ending location, and/or a vehicle speed.

18. The vehicle of claim 10, wherein the assistance model is trained with data acquired during manual trailer backup sessions where each session is labeled as one of assistance needed or assistance not needed.

19. The vehicle of claim 10, wherein the process of enabling the trailer backup assist system includes completing a transaction.

20. The vehicle of claim 10, wherein the process of enabling the trailer backup assist system includes downloading software.

* * * * *